United States Patent Office 3,141,062
Patented July 14, 1964

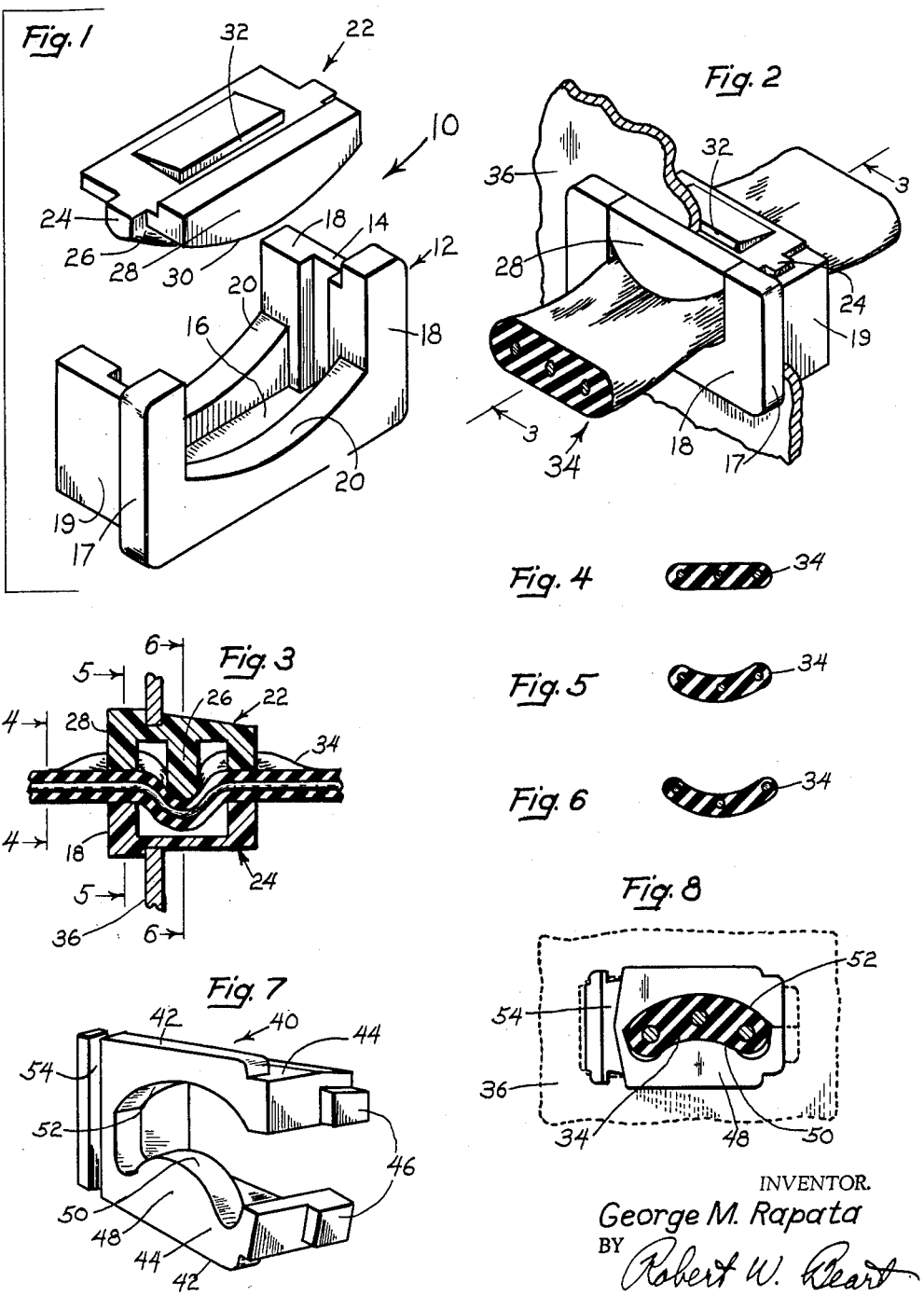

3,141,062
ARCUATE SLOT STRAIN RELIEF GROMMET
George M. Rapata, Park Ridge, Ill., assignor to Illinois
Tool Works Inc., Chicago, Ill., a corporation of
Delaware
Filed Aug. 8, 1963, Ser. No. 300,750
9 Claims. (Cl. 174—153)

The present invention relates to a novel fastening means, and more particularly to a strain relief grommet of the type adapted for insertion within a workpiece or panel aperture to secure an elongated workpart or conductor passing through the aperture and prevent its withdrawal.

Various kinds of strain relief grommets have been proposed for use with an electrical conductor having a plurality of wires passing therethrough, but the necessity of making strain relief grommets adaptable for accommodating a conductor larger than that previously used has presented a problem. Several solutions have been proposed, one of which is the provision of holes within the grommet for accommodating various sized conductors or workparts. However, none of the solutions has provided a novel grommet for an electrical conductor having, for example, three wires so that the grommet can accommodate such a conductor in the same hole size of a panel aperture that would be needed for a two wire conductor. An effective solution to this problem is contemplated by the present invention which provides the strain relief grommet with crimping and workpart width reducing means to foreshorten the workpart width while it is secured at the same time in the workpiece or panel.

One of the objects of the present invention is to provide a novel strain relief grommet made of a dielectric resilient plastic material which may be easily applied to an apertured panel after the body portions of the grommet have been assembled around the workpart, and before said body portions have been shifted together so as to grip the conductor tightly during application of the grommet to the aperture panel to facilitate insertion.

Another object of the present invention is to provide a novel grommet which can be used to convert a two wire installation into a three wire installation, etc., without the necessity of enlarging the panel aperture by crimping and reducing the workpart width through the novel structure of the grommet.

A still further object of the present invention is to provide a novel strain relief grommet of the above described type which may be economically produced from resilient plastic material while using a minimum amount of material.

Other objects and advantages of the present invention will become apparent from the following description and accompanying drawing wherein:

FIG. 1 is a perspective view showing one embodiment of the present invention;

FIG. 2 is a fragmentary perspective view showing the strain relief grommet of FIG. 1 fully assembled with an elongated workpart or conductor and an aperture workpiece or panel;

FIG. 3 is a sectional view taken along line 3—3 of FIG. 2;

FIG. 4 is a sectional view of the elongated workpart or conductor used with the present invention taken along line 4—4 of FIG. 3;

FIG. 5 is a sectional view of the elongated workpart or conductor taken along line 5—5 of FIG. 3;

FIG. 6 is a sectional view of the elongated workpart or conductor taken along line 6—6 of FIG. 3;

FIG. 7 is a perspective view showing the second embodiment of the present invention;

FIG. 8 is a side elevational view of the grommet of FIG. 7.

Referring now more specifically to the drawing wherein similar parts will be designated by similar numerals throughout the various figures, a grommet 10 embodying one form of the present invention is shown in FIGS. 1–3. The grommet 10 may be easily and economically produced from any suitable resilient plastic dielectric material such as nylon. While the grommet may be adapted for accommodating workparts or conductors of various sizes and shapes, the structure disclosed for the purpose of illustrating the invention is especially suitable for use with a three wire workpart or conductor as shown in FIGS. 4–6.

As can be seen from FIGS. 1–2, the grommet 10 comprises male and female members 12, 22 for accommodating and gripping the elongated workpart 34 within the apertured panel 36. The female member 12 is provided with a head means 17 for engagement with one side of the apertured panel 36 and a shank portion or section 19 for axial insertion within the apertured panel. The head means and shank portion or section of the female member are part of a pair of integrally joined, but separated U-shaped portions 18 defining the elongated recess 16 therebetween. At two sides of the elongated recess 16 is an upstanding slot or recess 14 which also separates the U-shaped portions 18 of the female member. Each of the U-shaped portions 18 is provided with an arcuate bridging surface or portion 20 which accommodates the wire and aids in crimping and reducing the width of the workpart or conductor 34.

The male member 22 of the FIGS. 1–3 embodiment is provided, inter alia, with a shoulder means 32 for engaging the opposite side of the panel 36 from the head means 17 of the female member. The head and shoulder means of the male and female members thus cooperate to hold the grommet in position and prevent its withdrawal from the panel. The male member 22 is further provided with a lug means 24 which cooperates with the slot or recess 14 of the female member to interlock the same with the male member. Extending from the lug means 24, on the bottom side of the male member 22, is a wedge means 26 having an arcuate surface for crimping the elongated workpart or conductor 34 into the recess 16 of the female member to foreshorten the workpart width. An additional workpart crimping and width reducing means is provided on the male member in the form of portion 28 having an arcuately extending surface 30 for cooperation with one of the arcuate bridging portions 20 of the female member.

As will be evident from an inspection of FIGS. 2–3 of the drawing, the elongated workpart 24 is accommodated and gripped by the grommet 10 within the elongated workpart receiving passageway defined by the spaced apart relationship of the male and female members when in assembled position. At the same time, the workpart is crimped and reduced in width to foreshorten the same and allow a workpart having a specified width to be used in the same hole size of a panel aperture as a workpart having a lesser width. The crimping of the workpart is essentially accomplished by the wedge portion 26 of the male member and the elongated recess 16 of the female member, and the foreshortening of the workpart width is made possible by the portion 28 of the male member in cooperation with one of the arcuate bridging portions 20 of the female member. However, it will be evident that each of the above referred to portions of the grommet provides a workpart crimping and width reducing function by the very nature of its engagement with the workpart. It is also to be understood that while the crimping and width reducing function of the grommet is performed by the complementary concave and convex surfaces of the grommet of FIGS. 1–3, other types of surfaces and projections may be used to accomplish this end.

FIGS. 4–6 show the shape of the three wire workpart or conductor, used for illustrative purposes in describing the present invention, as it is prior to engagement by the grommet and after being deformed and radially compressed by the above recited portions of the grommet. The workpart or three wire conductor of FIG. 4 is not deformed as shown in the drawing since it has not been enaged by any of the portions of the grommet. However, in FIG. 5, the workpart or conductor is shown as being deformed and radially compressed by the portion 28 of the male member and the arcuate bridging portion 20 of the female member. Similarly, the workpart or conductor of FIG. 6 is shown as it is deformed and radially compressed by the wedge portion 26 and elongated recess 16, but it is to be noted that in both FIGS. 5 and 6, the three wires are separated along the conductor width rather than being compressed together due to the deformation and radial compression of the workpart or conductor.

FIGS. 7 and 8 show the second embodiment of the present invention which is designated by numeral 40 wherein a pair of opposed shank portions or sections 44 are connected by a resilient hinge 54 to promote flexibility of the sections for insertion within the panel aperture. In this embodiment, each of the shank portions or sections of the one-piece grommet have a head means 42 and a shoulder portion 46 for engaging opposite sides of a panel. The workpart crimping and width reducing means comprises an upstanding abutment 48 having a convex surface 50 formed on the lower shank section for cooperation with a concave surface 52 of the upper shank section for performing substantially the same function and results heretofore described in connection with FIGS. 1–3 of the first embodiment.

In particular, this embodiment relieves any strains imparted to the conductor in substantially the same manner as my prior issued Patent No. 3,057,001, dated October 9, 1962 by gripping the conductor in a very secure manner between surfaces 50, 52 to prevent undesirable transfer of stresses. In addition, surfaces 50, 52 of grommet 40 act to crimp and reduce the width of the workpart for accommodating larger conductors therein in the same manner as the FIGS. 1–3 embodiment.

While the preferred embodiments of the present invention have been shown and described herein, it is obvious that many structural details may be changed without departing from the spirit and scope of the appended claims.

The invention is claimed as follows:

1. A strain relief grommet adapted for insertion within an apertured panel comprising first and second spaced apart members for accommodating and gripping an elongated workpart therebetween when the members are moved together, at least one of said members having a shank means for axial insertion within the panel aperture and head means engageable with one side of the panel, the other of said members having shoulder means engageable with the other side of the panel when the members are positioned within the aperture, means associated with the members for holding the head and shoulder means of the members in engagement with the respective sides of the panel, means for accommodating the elongated workpart including a longitudinal workpart receiving passageway defined by the spaced apart relationship of the members when in workpiece supporting position and coextensive with the shank means, and cooperating workpart crimping and width reducing surfaces formed on each of the members for deforming the workpart into arcuate form and radially compressing the same to foreshorten the workpart width.

2. A one-piece strain relief grommet made of dielectric material adapted to be inserted axially and snapped into fixed position within the complementary aperture of a panel, said grommet having an axial shank comprising a pair of cooperating spaced apart shank sections integrally joined at one end thereof by a resilient hinge to promote flexibility of the shank sections for insertion within the panel aperture, a head portion for each of the shank sections disposed at the extremities opposite from the entering end thereof and having an outwardly extending surface for engaging one side of an apertured panel, shoulder means on at least one of the shank sections and spaced axially from the panel engaging surface of the head portions for engaging the opposite side of the panel, means for accommodating an elongated workpart including a longitudinal workpart receiving recess which defines a passageway with the spaced apart shank sections defining the wall portions of the passageway and cooperating workpart crimping and width reducing surfaces formed on each of the shank sections for arcuately deforming the workpart and radially compressing the same to foreshorten the workpart width.

3. A strain relief grommet made of dielectric material adapted for insertion within an apertured panel comprising first and second spaced apart members for accommodating and gripping an elongated workpart therebetween when said members are moved together, said one member having a shank portion for axial insertion within the panel aperture and head means integrally joined therewith for engagement with one side of the panel, the other member having shoulder means engageable with the other side of the panel when in assembled relation with the first member, means associated with the members for holding the head and shoulder means into engagement with the sides of the panel, means for accommodating the elongated workpart including a longitudinal workpart receiving recess defined by the spaced apart members, and cooperating workpart crimping and width reducing surfaces formed on each of the members traversing said workpart receiving recess for deforming the workpart into arcuate form and radially compressing the same to foreshorten the workpart width.

4. A strain relief grommet as claimed in claim 1 wherein the workpart crimping means further includes a wedge means having an arcuate surface formed on one of the members, and an elongated recess formed on the other member and being aligned with said wedge means for cooperation therewith.

5. A strain relief grommet as claimed in claim 1 wherein the width reducing surfaces formed on said members comprise complementary concave and convex surfaces.

6. A strain relief grommet as claimed in claim 3 wherein the means for holding the head and shoulder means into engagement with one another includes a lug formed on one member and aligned with a recess formed on the other member for cooperation therewith.

7. A strain relief grommet as claimed in claim 3 wherein the member having the head means and shank portion comprises a pair of U-shaped portions integral with each other but separated by a vertically extending recess, and the other of said members of said grommet includes a lug portion for cooperation with said vertically extending recess to align the members in cooperative relationship and accomplish the gripping of the workpart therebetween.

8. A strain relief grommet as claimed in claim 3 wherein the member having the head means and shank portion comprises a pair of integral U-shaped portions connected by spaced arcuate bridging surfaces, the spaced apart bridging surfaces defining an elongated recess extending between the bridging surfaces and a substantially vertical recess extending along the inner periphery of the integral upstanding portions and intersecting the elongated recess; the other member having lug means for cooperation with the substantially vertically extending recess, wedge means for reception by the elongated recess, and spaced outwardly extending arcuate surfaces complementary with said arcuate bridging surfaces, the outwardly extending arcuate surfaces and the wedge means of said last mentioned member adapted to coact with the arcuate bridging surfaces and elongated recess respectively of said first mentioned member for gripping said workpart, said outwardly extending arcuate surfaces and said arcuate bridging surfaces also adapted to deform the workpart to reduce the width thereof.

9. A strain relief grommet adapted for insertion within an apertured panel comprising first and second spaced apart members for accommodating and gripping an elongated workpart therebetween when the members are moved together, at least one of said members having a shank means for axial insertion within the panel aperture and head means engageable with one side of the panel, the other of said members having shoulder means engageable with the other side of the panel when the members are positioned within the aperture, means associated with the members for holding the head and shoulder means of the members in engagement with the respective sides of the panel, means for accommodating the elongated workpart including a longitudinal workpart receiving passageway defined by the spaced apart relationship of the members when in workpart supporting position and coextensive with the shank means, and complementary concave and convex surfaces formed on said members and traversing the workpart receiving passageway for deforming the workpart into arcuate form and radially compressing the same to foreshorten the workpart width.

References Cited in the file of this patent

UNITED STATES PATENTS 2,974,186     Klumpp ---------------- Mar. 7, 1961
3,057,001     Rapata ---------------- Oct. 9, 1962

OTHER REFERENCES

German printed application, 1,106,864, May 18, 1961.